United States Patent
Jang (10) Patent No.: US 10,626,770 B2
(45) Date of Patent: Apr. 21, 2020

(54) HEAT COVER DEVICE OF CATALYTIC CONVERTER FOR VEHICLE

(71) Applicants: Hyundai Motor Company, Seoul (KR); Kia Motors Corporation, Seoul (KR)

(72) Inventor: Chun Soon Jang, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/053,530

(22) Filed: Aug. 2, 2018

(65) Prior Publication Data

US 2019/0234275 A1 Aug. 1, 2019

(30) Foreign Application Priority Data

Jan. 30, 2018 (KR) .................. 10-2018-0011078

(51) Int. Cl.
*F01N 3/28* (2006.01)
*F01N 13/14* (2010.01)
*B01D 53/94* (2006.01)

(52) U.S. Cl.
CPC ............... *F01N 3/28* (2013.01); *B01D 53/94* (2013.01); *F01N 13/14* (2013.01); *F01N 2450/22* (2013.01)

(58) Field of Classification Search
None
See application file for complete search history.

(56) References Cited

U.S. PATENT DOCUMENTS

2007/0081927 A1   4/2007   Baek
2010/0229540 A1   9/2010   Waggoner et al.

FOREIGN PATENT DOCUMENTS

| JP | 2013-086159 A | 5/2013 |
| JP | 2015-200219 A | 11/2015 |
| KR | 10-0916027 B1 | 9/2009 |
| KR | 10-2009-0126664 A | 12/2009 |
| KR | 10-1593769 B1 | 2/2016 |

*Primary Examiner* — Walter D. Griffin
*Assistant Examiner* — Jelitza M Perez
(74) *Attorney, Agent, or Firm* — Morgan, Lewis & Bockius LLP (57) ABSTRACT

A heat cover device of a catalytic converter for a vehicle may include a shell of the catalytic converter, and a heat cover including a left cover and a right cover that are secured to an external surface of the shell, wherein each of the left cover and the right cover includes a support cover portion which is open outwards and then exert an elastic restoring force inwards after being open outwards, and a close-contact cover portion which is circular-arc shaped to be in contact with the external surface of the shell and integrally extends to both end portions of the support cover portion to be tightly fitted and secured to the external surface of the shell due to the elastic restoring force.

14 Claims, 7 Drawing Sheets

HEAT COVER DEVICE OF CATALYTIC CONVERTER FOR VEHICLE

CROSS REFERENCE TO RELATED APPLICATION

The present application claims priority to Korean Patent Application No. 10-2018-0011078, filed Jan. 30, 2018, the entire contents of which is incorporated herein for all purposes by this reference.

BACKGROUND OF THE INVENTION

Field of the Invention

The present invention relates generally to a heat cover device of a catalytic converter for a vehicle and, more particularly, to a heat cover device of a catalytic converter for a vehicle configured for improving welding durability of the heat cover which is attached to an external surface portion of the catalytic converter to block high temperature heat from the catalytic converter.

Description of Related Art

Generally, a turbo charger mounted in a vehicle is an apparatus capable of pressurizing intake air using the pressure of exhaust gas discharged to an exhaust system of an engine, to improve filling efficiency of the intake air flowing into a combustion chamber of the engine, and is mainly applied to a high-power engine.

Also, the exhaust system of the engine having the turbo charger applied thereto is mounted with a warm-up catalytic converter (WCC), as a kind of a post-treatment apparatus of fixation efficiency capable of effectively oxidizing not only CO and HC components contained in the exhaust gas but also SOF components.

Figure 1:
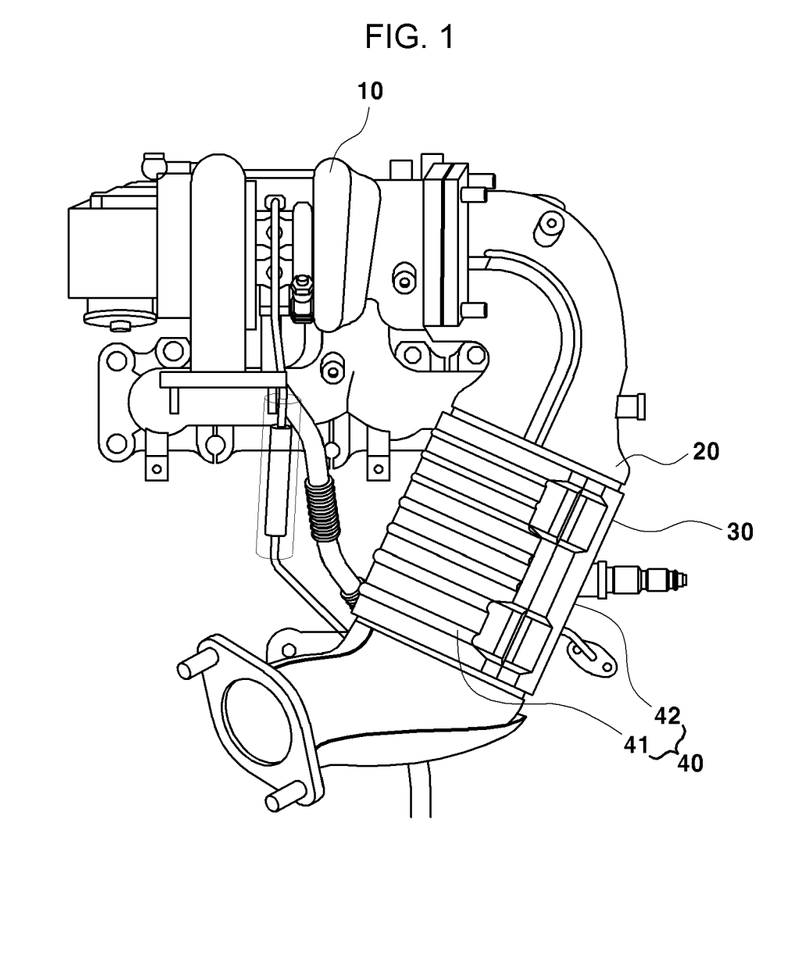
FIG. 1 is a schematic diagram showing the position in which a warm-up catalytic converter and a heat cover are mounted in an exhaust pipe extending from a turbo charger.
Figure 2:
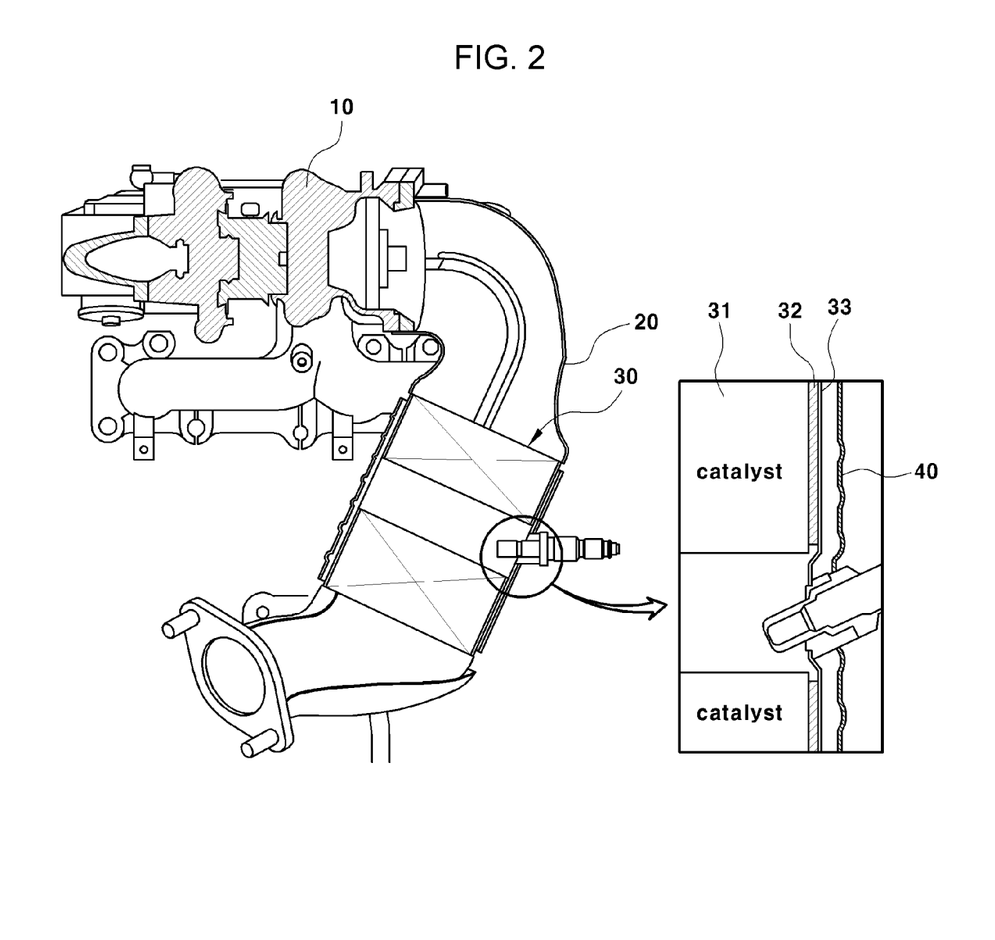
FIG. 2 is a sectional view showing a state in which a warm up catalytic converter and a heat cover are mounted in an exhaust pipe extending from a turbo charger.

Referring to FIG. 1 and FIG. 2, the warm-up catalytic converter 30 is mounted in an exhaust pipe 20 connected to an turbo charger 10, and may include a catalyst 31, a mat 32 which is in close contact with an external surface of the catalyst 31 and blocks the heat of the catalyst while supporting the catalyst, and a shell 33 of a case structure which may include and shields the catalyst 31 and the mat 32.

The warm-up catalytic converter 30 rises to a high temperature due to exhaust heat, causing problems such as damage to peripheral parts due to heat. Therefore, to prevent this, a separate heat cover 40 is welded to an external surface portion of the shell 33 in the warm-up catalytic converter to prevent the heat from being emitted into the surroundings.

The heat cover 40 is divided into a left cover 41 and a right cover 42 having an approximately semi-elliptical cross-sectional shape, in which the left cover 41 and the right cover 42 are in close contact with the external surface portion of the shell 33 to be elliptical-cylinder shaped, and then the contact portion thereof is subjected to fillet welding.

The warm-up catalytic converters of different specifications are mounted in vehicles of different types, and shells of different diameters are applied to the warm-up catalytic converters of different specifications. However, since the heat covers welded to the external surface portion of the shell have the same diameter, there is a problem that peeling or cracking occurs in the welded portion between the shell and the heat cover.

For example, when the shell diameter of the warm-up catalytic converter mounted in a specific type of vehicle is smaller than an internal diameter of the heat cover which is cylindrical-shaped by the left cover and the right cover, it is difficult to make the heat cover come into close contact with the shell surface. Therefore, there are problems that welding cannot be easily performed, and peeling or cracking occurs in the welded portion due to various vehicle vibrations including vibration caused by driving the turbo charger even though the heat cover is welded to the shell.

Furthermore, when peeling or cracking occurs in the welded portion between the shell and the heat cover, the heat shielding function of the heat cover may be partially lost, which leads to occurrence of abnormal sounds because the heat cover may be shaken due to vehicle vibration.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a heat cover device of a catalytic converter for a vehicle, in which the heat cover welded to a shell of a warm-up catalytic converter is configured to be adjustable in size to fit a diameter of the shell of the warm-up catalytic converter, so that the heat cover may be easily welded and securely held to the shell, improving rigidity and durability of the welded portion of the heat cover.

Various aspects of the present invention are directed to providing a heat cover device of a catalytic converter for a vehicle, the device including: a shell of the catalytic converter; and a heat cover including a left cover and a right cover that are welded to an external surface of the shell, wherein each of the left cover and the right cover may include a support cover portion which is configured to be opened outwards and then exert an elastic restoring force inwards after being opened outwards, and a close-contact cover portion which is circular-arc shaped to be in close contact with the external surface of the shell and integrally extends to both end portions of the support cover portion to be tightly fitted and welded to the external surface of the shell due to the elastic restoring force.

According to an exemplary embodiment of the present invention, the close-contact cover portion may have a welding guide hole extending therethrough for welding with the shell.

When the welding is performed with welding material between the close-contact cover portion and the external surface of the shell through the welding guide hole, the welding material may be applied starting from a position of a center portion of the welding guide hole, applied along an internal diameter portion of the welding guide hole, and then applied back to the position of the center portion of the welding guide hole as an end point.

According to another exemplary embodiment of the present invention, a straight cut portion and a circular cut portion may be continuously formed for welding the shell to an end portion of the close-contact cover portion.

When the welding is performed with the welding material between the close-contact cover portion and the external surface of the shell through the straight cut portion and the circular cut portion, the welding material may be applied starting from a position of a center portion of the circular cut portion, applied along an internal surface of the circular cut portion, and then applied along the straight cut portion.

A welding position between the close-contact cover portion and the external surface of the shell may be decided as a position where a mat covering the catalyst of the catalytic converter inside the shell is located.

Furthermore, the support cover portion may be separated apart from the external surface of the shell in a state where the close-contact cover portion is welded to the external surface of the shell.

The present invention can provide the following effects.

First, since the welded portion of the heat cover may be adjustable in size to fit the shell diameter of the warm-up catalytic converter, the heat cover may be easily welded to shells having different sizes for all vehicle types.

Second, the welded portion of the heat cover is configured to be easily welded to a surface of the shell while being in close contact therewith, improving rigidity and durability of the welded portion.

Third, the heat shielding performance of the heat cover may be easily exhibited due to the increase in rigidity and durability of the welded portion of the heat cover and the improvement in the durability, and a cracking and peeling phenomenon of the heat cover and occurrence of abnormal sounds due to various vibrations may be avoided.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, embodiments of the present invention will be described in detail with reference to the accompanying drawings As described above referring to FIG. 1 and FIG. 2, the warm-up catalytic converter 30 mounted in the exhaust pipe 20 is configured to include a catalyst 31, a mat 32 which is in close contact with external surface of the catalyst 31 to support the catalyst and block heat from the catalyst, a shell 33 of a case structure for including and protecting the catalyst 31 and the mat 32, and a heat cover 40 which is welded to an external surface portion of the shell 33 to prevent high temperature exhaust heat from being emitted to the surrounding parts.

The heat cover 40 is divided into a left cover 41 and a right cover 42 having an approximately semi-elliptical cross-sectional shape, in which the left cover 41 and the right cover 42 are welded to be in close contact with the external surface portion of the shell 33.

The warm-up catalytic converters of different specifications are mounted in vehicles of different types, and shells of different diameters are applied to the warm-up catalytic converters of different specifications. However, since the heat covers welded to the external surface portion of the shell have the same diameter, there is a problem that peeling or cracking occurs in the welded portion between the shell and the heat cover.

For example, when the shell diameter of the warm-up catalytic converter mounted in a specific type of vehicle is smaller than an internal diameter of the heat cover which is cylindrical-shaped by the left cover and the right cover, it is difficult to make the heat cover come into close contact with the shell surface. Therefore, there are problems that welding cannot be easily performed, and peeling or cracking occurs in the welded portion due to various vehicle vibrations including vibration caused by driving the turbo charger even though the heat cover is welded to the shell.

Accordingly, to solve these problems, the present invention is focused on improving rigidity and durability of the welded portion of the heat cover, by allowing the heat cover to be in close contact with the surface of the shell regardless of the shell diameter and to be easily welded and securely hold to the shell.

Figure 3:
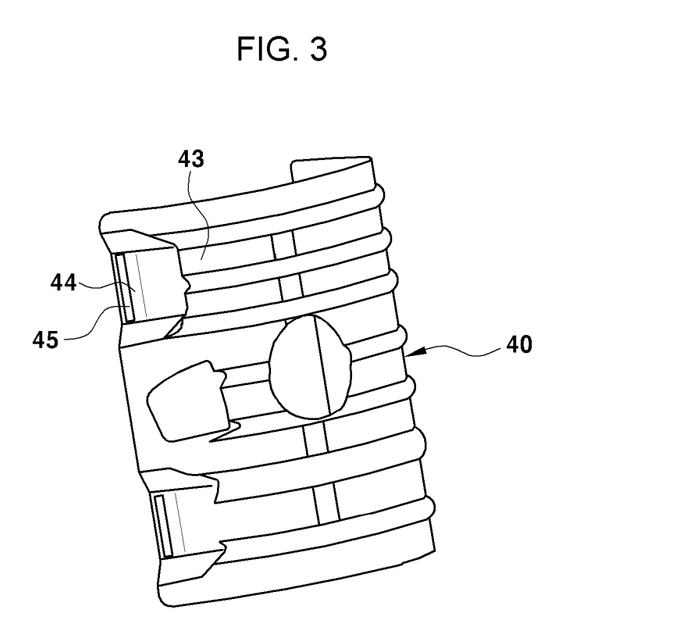
FIG. 3 is a schematic view showing a heat cover of a catalytic converter for a vehicle according to an exemplary embodiment of the present invention.
Figure 4:
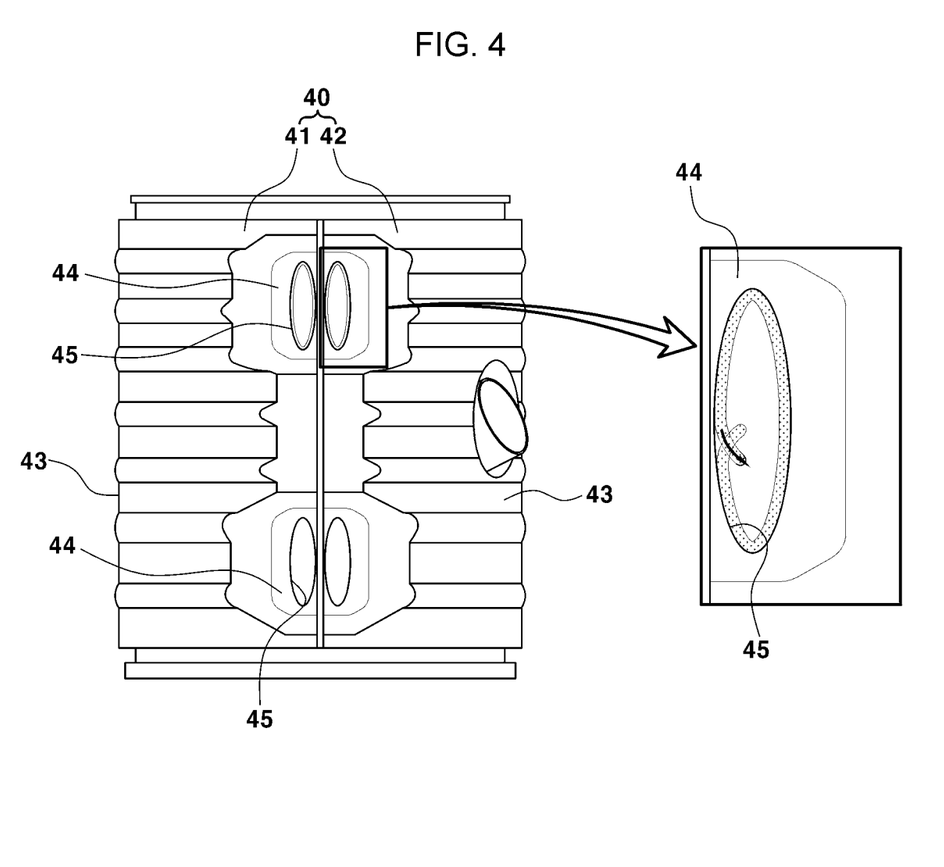
FIG. 4 is a plan view showing an example of welding a heat cover of a catalytic converter for a vehicle according to an exemplary embodiment of the present invention.

FIG. 3 is a schematic view showing a heat cover of a catalytic converter for a vehicle according to an exemplary embodiment of the present invention, and FIG. 4 is a plan view showing an example of welding a heat cover to a shell according to an exemplary embodiment of the present invention.

As shown in FIG. 3 and FIG. 4, the heat cover 40 welded to the external surface of the shell 33 is configured with a left cover 41 and a right cover 42 having the same shape as each other.

The left cover 41 and the right cover 42 are configured such that they may be opened outwards like a clamper and exert an elastic restoring force inwards after the clamper is opened outwards.

For the present purpose, the left cover 41 and the right cover 42 may include a support cover portion 43 which is curved in a "U" shape to open outwards and then exert an elastic restoring force inwards after being opened outwards, and a close-contact cover portion 44 which is circular arc-shaped to be in close contact with the external surface of the shell 33 and integrally extends to both end portions of the support cover portion 43.

Figure 6:
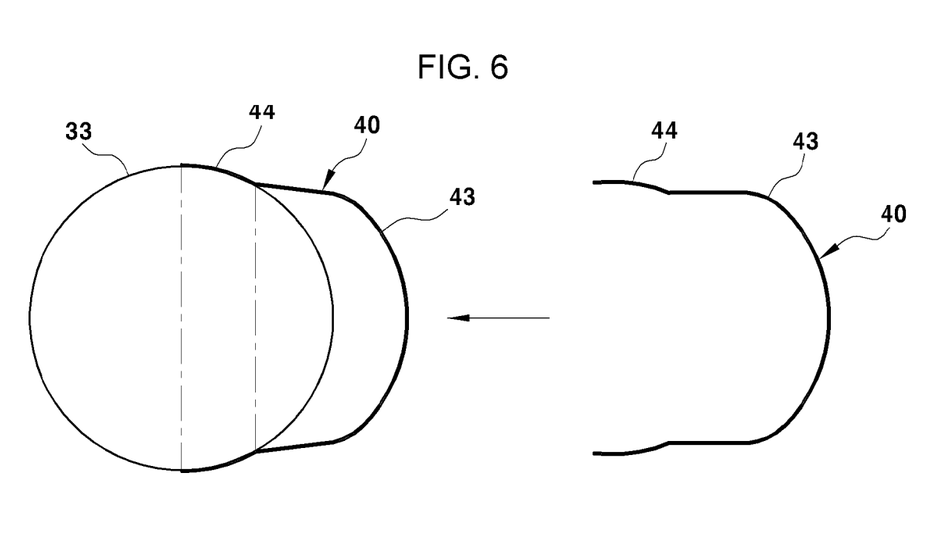
FIG. 6 is a cross-sectional view showing a state in which the heat cover of the present invention is fit into a shell.

As shown in FIG. 6, when the close-contact cover portion 44 of the left cover 41 and the right cover 42 are opened outwards and then fitted to the external surface portion of the shell 33, the support cover portion 43 also opens outwards and then generates the resilient restoring force, whereby the close-contact cover portion 44 may be easily in close contact with the external surface of the shell 33 due to the resilient restoring force.

For example, even though the shell diameter of the warm-up catalytic converter mounted in a specific type of vehicle is larger or smaller than an internal diameter of the heat cover having the cylindrical shape with the left and right covers, when the close-contact cover portion 44 is pushed towards the surface of the shell 33 while holding the support cover portion 43, the support cover portion 43 is opened outwards while having an elastic restoring force and at the same time the close-contact cover portion 44 may be fitted to the external surface of the shell 33, whereby the close-contact cover portion 44 may be in close contact with the shell.

Therefore, regardless of the diameter of the shell 33 of the catalytic converter, the heat cover 40 may be fitted and tightly fixed to the external surface of the shell 33, and at the present time the welding operation may be smoothly performed.

That is, since the close-contact cover portion 44 is tightly fixed to the external surface of the shell 33 due to the elastic restoring force of the support cover portion 43, the welding between the close-contact cover portion 44 and the surface of the shell 33 may be performed very easily.

According to an exemplary embodiment of the present invention, the close-contact cover portion 44 has a welding guide hole 45 extending therethrough to perform smooth welding of the close-contact cover portion 44 and the shell 33, wherein the welding guide hole 45 may be formed in various shapes such as a circular shape, an elliptical shape, a rectangular shape, and the like.

As shown in FIG. 4, the welding between the close-contact cover portion 44 and the surface of the shell 33 may be performed very easily.

The welding between the close-contact cover portion 44 and the surface of the shell 33 is performed through the welding guide hole 45 formed in the close-contact cover portion 44, and the welding material is first applied starting from the position of a center portion of the welding guide hole 45, continuously applied along the internal diameter portion of the welding guide hole 45, and applied back to the position of the center portion of the welding guide hole 45 as the end point.

Herein, the reason why the welding material is applied to the center portion of the welding guide hole 45 at the start and end portion of welding is that the welding material may be uniformly applied without being accumulated along the welded portion (a boundary portion between the close-contact cover portion 44 and the surface of the shell 33) which is substantially needed, because the amount of the welding material from a welding gun instantaneously increases and accumulates at the start and end portion of welding.

After the close-contact cover portion 44 which is the welded portion of the heat cover 40 is adjustable in size to fit the diameter of the warm-up catalytic converter, the welding is performed such that the welding material is uniformly applied between the welding guide hole 45 of the close-contact cover portion 44 and the surface of the shell 33, whereby rigidity and durability of the welded portion of the heat cover may improve. Accordingly, not only the heat shielding performance of the heat cover may be easily improved, but also a cracking and peeling phenomenon of the heat cover and the occurrence of the abnormal sound due to the vibration may be prevented.

Figure 5:
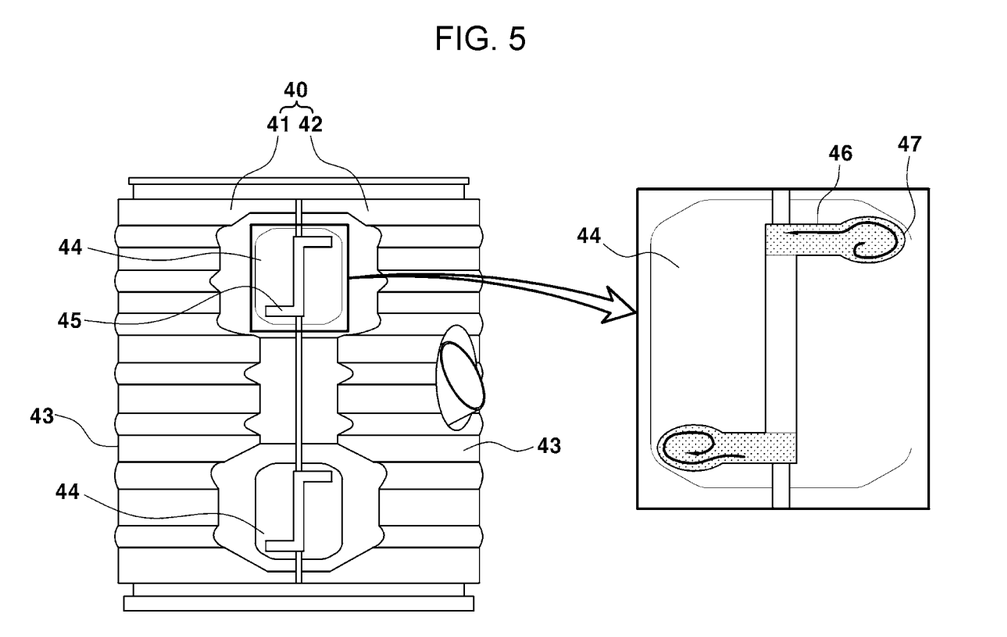
FIG. 5 is a schematic view showing a heat cover of a catalytic converter for a vehicle according to another exemplary embodiment of the present invention.

FIG. 5 is a schematic view showing a heat cover of a catalytic converter for a vehicle according to another exemplary embodiment of the present invention;

According to another exemplary embodiment of the present invention, the welding guide hole 45 may include a straight cut portion 46 and a circular cut portion 47 are continuously formed for welding the shell 33 to an end portion of the close-contact cover portion 44 to enable smooth welding between the close-contact cover portion 44 and the shell.

The straight cut portion 46 formed at the end portion of the close-contact cover portion 44 is formed to be disposed in a direction perpendicular to the longitudinal direction of the heat cover, and the circular cut portion 47 is formed to extend inwards from an end portion of the straight cut portion 46 with a circular space for receiving the welding material at the start of welding.

According to another exemplary embodiment of the present invention, the welding guide hole 45 may further include a straight cut portion 48 disposed along the longitudinal direction of the heat cover 40. Accordingly, the welding between the close-contact cover portion 44 and the surface of the shell 33 is performed through the straight cut portion 46 and the circular cut portion 47 formed in the close-contact cover portion 44, in which the welding material is applied first starting from the position of the center portion of the circular cut portion 47, applied along the internal diameter of the circular cut portion 47, and subsequently applied along the straight cut portion 46.

At the present time, even though a large amount of welding material accumulates at the center portion (the surface of the shell) of the circular cut portion 47 when the welding material is applied for the first time, the welding material is confined in the circular cut portion 47, and thus the welding material may be uniformly applied between the internal diameter of the circular cut portion 47 and the surfaces of the shell 33 without being accumulated.

As shown in FIG. 5, the welding is further performed on the gap between the left cover 41 and the right cover 42, in addition to the circular cut portion 47 and the straight cut portion 46, the welding between the heat cover 40 and the shell 33 may be performed more securely.

Accordingly, the circular cut portion 47 and the straight cut portion 46 of the close-contact cover portion 44 is uniformly welded to the surface of the shell 33, so that the rigidity and durability of the welded portion of the heat cover may improve, whereby the heat shielding performance of the heat cover may be easily achieved, as well as prevention of a cracking and peeling phenomenon of the heat cover and occurrence of abnormal sound due to various vibrations.

Figure 7:
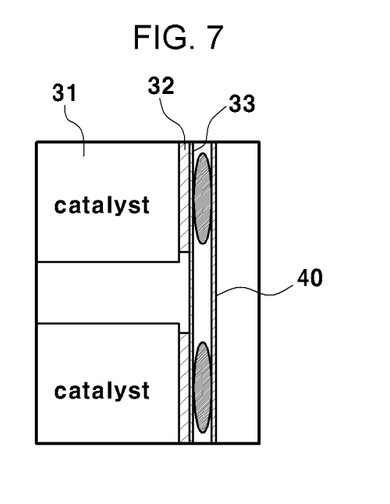
FIG. 7 is a cross-sectional view showing the position in which the heat cover of the present invention is welded to the shell of the catalytic converter.

Meanwhile, referring to FIG. 7, the welding position between the close-contact cover portion 44 and the surface of the shell 33 that are a constituent elements of the heat cover of the present invention, that is, the welding material application position, is preferably decided as a position where a mat 32 covering the catalyst 31 of the catalytic converter inside the shell 33 is located. The reason is that it is possible to minimize transference of high temperature exhaust heat directly to the welded portion and the heat cover and thus minimize the degradation of the durability of the welded portion due to the high temperature exhaust heat, because the high temperature exhaust heat transferred from the catalyst is reduced by about 100° C. or more by the mat 32.

Furthermore, since the support cover portion 43 is kept separated apart from the external surface of the shell 33 in a state where the close-contact cover portion 44 is welded to the external surface of the shell 33, the exhaust heat emitted from the catalytic converter may be confined in the separated space and the heat emitted to the outside may be blocked by the heat cover 40, whereby it is possible to easily avoid a problem of damage due to heat caused in peripheral parts due to high temperature exhaust heat.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A heat cover device of a catalytic converter, the device comprising:
    a shell of the catalytic converter; and
    a heat cover including a first cover and a second cover that are secured to an external surface of the shell,
    wherein each of the first cover and the second cover includes:
    a support cover portion which is open outwards and is configured to exert an elastic restoring force inwards after being open outwards; and
    a close-contact cover portion which is arc-shaped to contact with the external surface of the shell and integrally extends to first and second end portions of the support cover portion to be fitted and secured to the external surface of the shell due to the elastic restoring force,
    wherein the close-contact cover portion has a welding guide extending therethrough for welding with the shell.

2. The device according to claim 1, wherein, when the welding is performed with welding material between the close-contact cover portion and the external surface of the shell through the welding guide hole, the welding material is applied starting from a position of a center portion of the welding guide hole, applied along an internal diameter portion of the welding guide hole, and then applied back to a position of the center portion of the welding guide hole as an end point.

3. The device according to claim 1, wherein the welding guide hole includes:
    a first straight cut portion and a circular cut portion that are continuously formed for welding the shell to an end portion of the close-contact cover portion.

4. The device according to claim 3, wherein the first straight cut portion is disposed in a direction perpendicular to a longitudinal direction of the heat cover.

5. The device according to claim 3, wherein the circular cut portion is disposed at an end of the first straight cut portion.

6. The device according to claim 5, wherein the circular cut portion includes a circular space for receiving the welding material therein.

7. The device according to claim 3, wherein the welding guide hole further includes a second straight cut portion connected to an end of the first straight cut portion along a longitudinal direction of the heat cover.

8. The device according to claim 3, wherein, when the welding is performed with the welding material between the close-contact cover portion and the external surface of the shell through the first straight cut portion and the circular cut portion, the welding material is applied starting from a position of a center portion of the circular cut portion, applied along an internal surface of the circular cut portion, and then applied along the first straight cut portion.

9. The device according to claim 1, wherein a welding position between the close-contact cover portion and the external surface of the shell is decided as a position where a mat covering a catalyst of the catalytic converter inside the shell is located.

10. The device according to claim 1, wherein the support cover portion is separated apart from the external surface of the shell in a state where the close-contact cover portion is secured to the external surface of the shell.

11. A method of welding the heat cover device according to claim 1, the method including:
    applying welding material, by starting from a position of a center portion of the welding guide hole, when the welding is performed with the welding material between the close-contact cover portion and the external surface of the shell through the welding guide hole;
    applying the welding material along an internal diameter portion of the welding guide hole; and
    applying the welding material back to a position of the center portion of the welding guide hole as an end point.

12. The method according to claim 11, further including:
    applying the welding material by starting from a position of a center portion of the circular cut portion, when the welding is performed with the welding material between the close-contact cover portion and the external surface of the shell through a straight cut portion and a circular cut portion of the welding guide hole;
    applying the welding material along an internal surface of the circular cut portion, and
    applying the welding material along the straight cut portion.

13. The method according to claim 12, wherein a welding position between the close-contact cover portion and the external surface of the shell is decided as a position where a mat covering a catalyst of the catalytic converter inside the shell is located.

14. The method according to claim 13, wherein the support cover portion is separated apart from the external surface of the shell in a state where the close-contact cover portion is secured to the external surface of the shell.

\* \* \* \* \*